US008503980B2

(12) United States Patent
Ma et al.

(10) Patent No.: US 8,503,980 B2
(45) Date of Patent: Aug. 6, 2013

(54) PROVIDING LOCATION-BASED SERVICES IN AN AD HOC ENVIRONMENT

(75) Inventors: Qian Ma, Beijing (CN); Krishna Ratakonda, Yorktown Heights, NY (US); Nianjun Zhou, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 12/871,997

(22) Filed: Aug. 31, 2010

(65) Prior Publication Data
US 2012/0052838 A1    Mar. 1, 2012

(51) Int. Cl.
*H04M 1/66*       (2006.01)
*H04M 1/56*       (2006.01)
*G06F 7/00*       (2006.01)
*G06F 15/16*      (2006.01)
*H04L 12/28*      (2006.01)

(52) U.S. Cl.
USPC ...... 455/411; 370/401; 379/142.01; 707/741; 709/203

(58) Field of Classification Search
USPC .............................................. 455/414.1, 411
See application file for complete search history.

(56) References Cited

U.S. PATENT DOCUMENTS

| | | | |
|---|---|---|---|
| 5,774,534 A | 6/1998 | Mayer | |
| 2003/0087648 A1* | 5/2003 | Mezhvinsky et al. | 455/456 |
| 2004/0093268 A1* | 5/2004 | Ramchandani et al. | 705/14 |
| 2007/0177616 A1* | 8/2007 | Jabri et al. | 370/401 |
| 2008/0313273 A1* | 12/2008 | Wang | 709/203 |
| 2011/0307489 A1* | 12/2011 | Oliver et al. | 707/741 |

OTHER PUBLICATIONS

Manouselis et al. Digital Audio Broadcasting: an Interactive Service Architecture. In 2001 IEEE Pacific Rim Conference on Communicaitons, Computers and Signal Processing, 2001.
Tomari et al. Design and Implementation of Internet-TV. In IEEE Transactions on Consumer Electronics, vol. 43, No. 3, Aug. 1997, pp. 953-960.
Zimmerman. Personal Area Networks: Near-field intrabody communication. IBM Systems Journal, vol. 35, Nos. 3&4, 1996.
Peer-to-Peer ZRTP. http://en.wikipedia.org/wiki/ZRTP.
Nokia—P2P Traffic Control Solution. http://www.zeropaid.com/news/8037/Nokia's+P2P+Traffic+Control+Solution.
Radio-frequency Identification. http://en.wikipedia.org/wiki/RFID.
ZFone. http://linux.softpedia.com/get/Communications/Internet-Phone/Zfone-12496.shtml.
Nokia—NFC. http://www.forum.nokia.com/main/resources/technologies/nfc/.

* cited by examiner

*Primary Examiner* — Patrick N. Edouard
*Assistant Examiner* — Timothy Pham
(74) *Attorney, Agent, or Firm* — Ryan, Mason & Lewis, LLP

(57) ABSTRACT

Techniques for implementing a location-based service include obtaining meta-information from a service provider comprising location-based service information, service provider contact information, and service provider authentication information, combining the meta-information into a message and encoding the message into a series of signals to be broadcast for implementing the service over an ad hoc environment, wherein in the environment there exists no pre-existing communication infrastructure and no pre-defined relationship between the service provider and one or more service receivers, broadcasting the series of signals as a message to service receivers in the ad hoc environment, enabling the service receiver to identify potential services using filters based on signal strength, computed distance, and/or service category, and facilitating a communication between the service provider and a service receiver via enabling the receiver to use the contact information to identify the service provider and the authentication information to verify the service provider.

20 Claims, 6 Drawing Sheets

PROVIDING LOCATION-BASED SERVICES IN AN AD HOC ENVIRONMENT

FIELD OF THE INVENTION

Embodiments of the invention generally relate to information technology, and, more particularly, to mobile communication.

BACKGROUND OF THE INVENTION

With the advance of mobile communication, location-based services become more popular. Existing location-based services consider the absolute location (for example, the latitude and longitude) of service providers, identifying (for instance, on a cellular phone) items based on distance measures, and a person can receive certain advertisements or information based on his or her resident address. Such existing approaches require the accurate location of the mobile devices (as well computers), and rely on a mature communication infrastructure and sophisticated subscription system for support. However, such approaches can lack the ability to enable location-based services in an ad hoc manner. Additionally, existing message delivery mechanisms are not suitable for many applications due to high cost and limitations on scalability in terms of end users.

SUMMARY OF THE INVENTION

Principles and embodiments of the invention provide techniques for providing location-based services in an ad hoc environment. An exemplary method (which may be computer-implemented) for implementing a location-based service, according to one aspect of the invention, can include steps of obtaining one or more items of meta-information from a service provider, wherein the service provider is not pre-defined, and wherein the one or more items of meta-information comprise information related to a location-based service, service provider contact information, and service provider authentication information; combining the one or more items of meta-information into one or more messages and encoding the one or more messages into a series of one or more signals to be broadcast as a message for implementing the location-based service over an ad hoc environment requiring no pre-existing communication infrastructure, wherein in the ad hoc environment there exists no pre-defined relationship between the service provider and one or more service receivers; broadcasting the series of one or more signals as a message for implementing the location-based service to one or more service receivers in the ad hoc environment, wherein the service provider has no prior knowledge of the one or more service receivers; enabling the one or more service receivers to display and alert the service provider using one or more filters based on at least one of signal strength, computed distance, service category, and one or more provider-defined criteria; and facilitating a communication between the service provider and a service receiver in the ad hoc environment to implement the service via enabling the service receiver to use the service provider contact information received in the message to identify the service provider and to use the service provider authentication information received in the message to verify the service provider.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (n) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
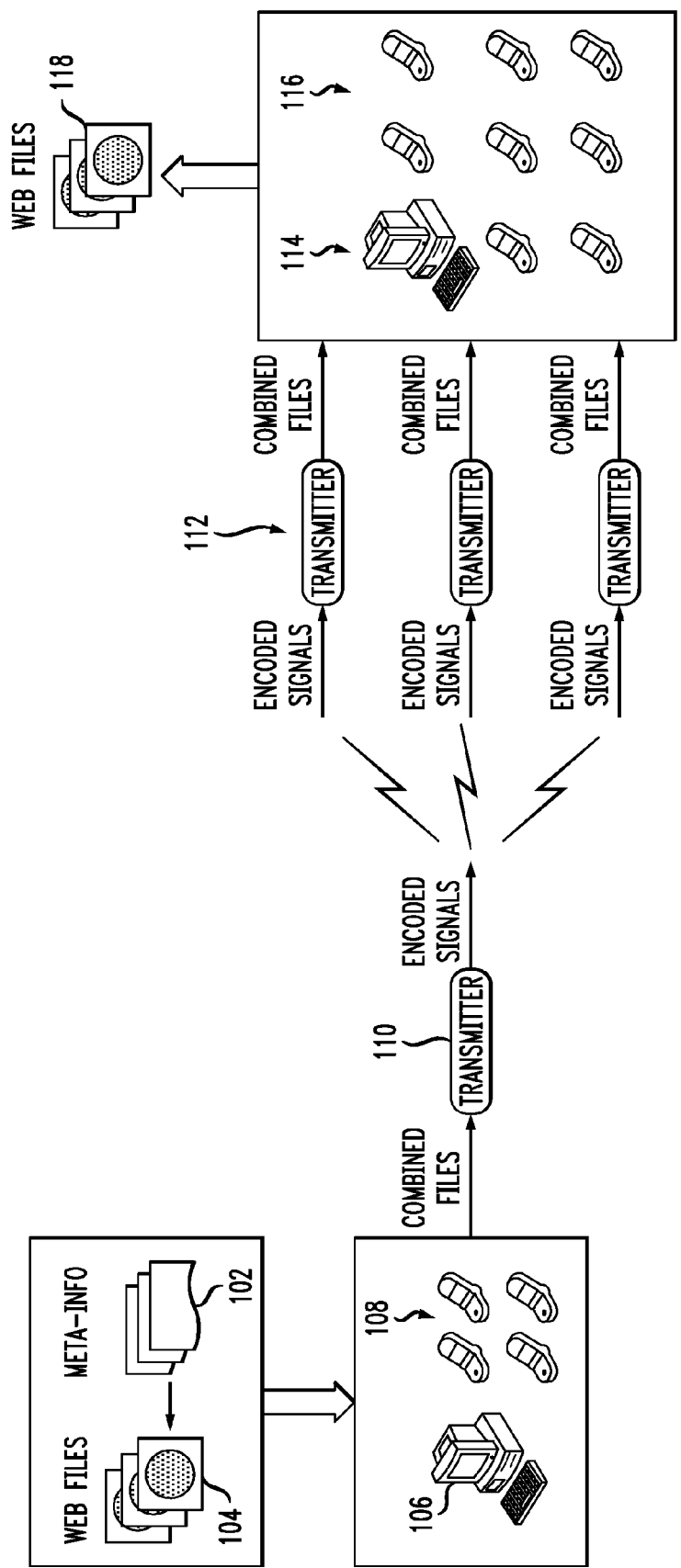
FIG. 1 is a diagram illustrating architecture, according to an embodiment of the present invention.

Principles of the invention include broadcasting messages to enable relative location-based services over an ad hoc environment. As used herein, an ad-hoc environment indicates that there is no pre-existing network infrastructure and/or pre-existing linkage between a service provider and service receiver in the environment. Accordingly, only when the service provider (that would like to provide the service) broadcasts the message and the service receiver enters the region is the linkage established. Once that set of circumstances no longer exists, the linkage will disappear. The relationship is dependent on the relative distance and the signal strength between the provider and receiver, and therefore, it is flexible adoptable. Existing infrastructure can provide support if physical locations of the service providers are pre-determined, but in certain scenarios, ad hoc techniques, such as those detailed in one or more embodiments of the invention, of enabling location-based service are advantageous.

By way of example and not limitation, in a mobile environment (such as wild island, open wild field), there is no pre-existing communication infrastructure to support a location-based service and ad hoc communication mechanism services can be implemented. Also, for example, a ceremony or event (such as a music or sport event) can be held in a public venue where there are many related services such as registration, food, information, etc. However, these services are only effective while you attend the event, and such services will go away if you leave or when the event ends. Additionally, for example, if the locations are relatively fixed, but the service providers themselves are flexible, then an ad hoc location-based service is also needed. For instance, in a flee market, both the service providers and receivers are potentially dynamic and last a very short period of time. For those scenarios, a traditional communication mechanism may either not exist or to may be too expensive to be feasible.

As described in connection with one or more embodiments of the invention, using an ad hoc infrastructure precludes the need for pre-existing network subscription and network infrastructure. The linkage among the service providers and receivers are established only when an ad hoc network is established between the devices. Location-based services depend on the relative distance and signal strength between the providers and receivers, and with such services, the relative distance can be more important than the absolution location. As such, when a receiver enters into the broadcasting region of a provider, the receiver can identify the service. The receiver's ability to identify the service is not, therefore, contingent upon the absolute location of the provider and receiver, such as their latitude/longitude or whether they are in a specific address. Accordingly, one or more embodiments of the invention include providing relative location-based services to devices in a local community. As used herein, a local service community can be defined as the reachable region of a service provider as the service provider broadcasts the service information.

In one or more embodiments of the invention, an additional transmitter is plugged into end-user devices (for example, cell phones) for supporting the devices to broadcast messages. As also described herein, each service provider can send out meta-information describing the nature of its information service, and can also send out the service information periodically. Additionally, in one or more embodiments of the invention, existing Wi-Fi or Bluetooth technologies can be used to support such communication.

The techniques detailed herein include providing a serverless mechanism for broadcasting messages, further including a structured process of compiling a message that can be delivered. One or more embodiments of the invention also include using meta-data that identifies classes of users that could potentially be interested in the message, the content of the message, as well as additional attributes (such as persistence, contact information, location of the service provider, etc.).

As also described herein, one or more embodiments of the invention include using a protocol for handling communications. The protocol can include the use of hardware in the form of a communication signaling system for ad hoc communication, a physical transport layer, location awareness system (if, for example, it is not part of the communication system), etc. The hardware provides a transport mechanism, compression and encoding (if required), as well as reliability. Additionally, in one or more embodiments of the invention, the protocol can allow for an automated handshake. An automated handshake can acknowledge, for example, that a transmission is from an authorized provider, that the type of data is relevant to the receiver, as well as what to do with the received data as the contextual situation changes (time, location, etc.).

Further, the content of messages such as those detailed herein can include decoder and decryption (executables) as part of the message, as well as multimedia data and textual information. In one or more embodiments of the invention, the content can also be multi-streamed, with one or more of these streams being decoded contingent on a personalized profile of the receiver. Additionally, once the message is received, the receiver can, for example, initiate a transaction (for instance, buying a service and/or product) with the sender through a different protocol (such as, for example, via a mobile phone network) using the contact information received through the initial message.

As described herein, with an ad hoc infrastructure, there is no requirement for a pre-existing network subscription or network infrastructure. The linkage among the service providers and receivers is established when an ad hoc network is established between the devices. Location-based services can depend on the relative distance between the providers and receivers.

By way of example, each provider may implement its service via web technologies such as, for example, hypertext markup language (HTML) and extensible markup language (XML) files, due to their rich capability on representation. Accompanying the service's meta-information, such as location, category, etc., those files can be further encoded as a series of signals that can be broadcasted by a transmitter to other devices. When the receiver obtains the broadcasted signals, the receiver can restore the signals into original web contents. Then, the receiver can decide whether it is interested with the provider based on the meta-information. If so, the receiver begins a communication with the service provider. The providers can also make use of this loop to broadcast services in the local community periodically.

As detailed herein, one or more embodiments of the invention includes using a broadcasting mechanism to deliver relative location-based services in a local region and/or community. As noted above, a service provider can enter meta-information in end-user devices (for example, cell phones) to describe a service itself, such as its relative location (distance), category, etc. The meta-information can be based, for example, on standard ontology in order to attain the common understanding among different service providers and receivers. These meta-data can also be bound into original files. As also noted herein, a service provider can use web technologies to implement a service (for example, using XML files to describe the user interface of the service, and using JavaScript files to process users' input and selection).

One or more embodiments of the invention include encoding all of the files and broadcasting in the local region and/or community. By way of example, a service is implemented via web technologies such as, for example, HTML, JavaScript. The user of the service can retrieve and read the service content by using a browser, and all of the files (such as, for example, HTML pages) that are needed to be transmitted to the user's browser will be encoded. Also, in one or more embodiments of the invention, a service provider can use its private technologies to implement the service. The service provider can provide a corresponding encoding method in the transmitter to send the content to the service user. Further, the service region/community is determined by the signal broadcasting capability of the transmitter, and a user who can receive the transmitted signal in his/her device can access the service. The service region/community can be further determined by the meta-information, wherein the service provider can define the relative distance it would like to provide the service, or the service provider can define some identity information to only allow the members of a community to access the service.

Accordingly, each service can provide its own identity and this information can be sent out with as part of the broadcasted context. Additionally, when a service receiver enters a corresponding local region, it will receive the broadcasted signals on a device. Example devices that can be used in connection with one or more embodiments of the invention include cell phones, smart phones, personal digital assistants (PDAs), laptop computers, mobile devices in the ad-hoc network, etc. These broadcast signals can be decoded to restore the original contents of the sent information, and one or more embodiments of the invention can also include checking the provider identity for security or information quality assurance purpose.

The service receiver can view meta-information before the actual content to decide whether or not it (that is, the receiver) should engage in a connection with the provider. For example, the category (one example piece of meta-information) may give the high-level description of the service. The receiver can compute the relative distance of the service through comparing the absolute coordinates between the provider and the receiver. If the receiver determines that it needs or would like the service, the receiver can browser the content (or perform the follow-up transactions with the provider if the bi-way communication is enabled in a physical layer). As used herein, a physical layer describes a signal transmission between devices.

In one or more embodiments of the invention, in the physical layer, a transmitter is plugged into the service provider and periodically broadcasts its service to a small region. The communication is only effective in this local region. In other words, the service receiver may automatically receive the broadcasted information when the receivers enters the region in question, and corresponding services will disappear if the service provider leaves or the receiver goes out of the broadcasting region. Additionally, in one or more embodiments of the invention, a transmitter can be plugged-in to an end-user device, as well as directly implemented as a component of a service or end-user device.

One or more embodiments of the invention can be implemented, by way of example, in connection with a hot-spot environment and a mobile environment. Such environments can exist, for example, in transportation facilities such as airplanes, trains, cruisers, etc. Also, such environments can lack a fixed location and can include, for example, a place holding temporary events such as a ceremony, an outdoor concert, etc. Further, such environments can lack re-occurrence capability. Nonetheless, as described herein in connection with one or more embodiments of the invention, even in the case of having fixed locations, the services themselves can be dynamic. (By way of example, it may be difficult to predict which service providers and receivers might appear at a flee market.)

Accordingly, one or more embodiments of the invention can be implemented in connection with a highly dynamic community, limited to a relatively small local region but with services that are closely related to the location. The groups of service providers and service receivers can change rapidly, and there may be no predefined relationship between the service provider and requester. The provider may also, in some instances, not publish itself to any well known registry. As such, in one or more embodiments of the invention, only when the receiver enters the provider's broadcasting range may the receiver receive messages from the provider. Further, when the service receiver leaves the region, the service will automatically become unavailable or be replaced by new services in the new region.

Accordingly, one or more embodiments of the invention include effectively setting-up a broadcasting mechanism to complete service delivery based on the relative instance between the provider and the receiver. The relative location-based services can complement a highly dynamic environment where the pre-existing infrastructures are often not feasible or too expensive (because, for example, they target delivering message to a static, larger region). Additionally, one or more embodiments of the invention include using a transmitter that can be a separate add-on apparatus (precluding the need, for example, to re-produce pre-existing infrastructures).

Further, one or more embodiments of the invention can include first using web format messages to implement the service, followed by encoding the service into a series of signals that can be broadcasted to a local region. This can balance the rich representation of web technologies and the effective transmission by traditional channels. Also, the service receiver can actively control the communication in order to prevent unwanted information. If the receiver is not interested in the service, the receiver can turn-off the channel after reading the meta-data of the service.

As noted, one or more embodiments of the invention can include implementing an add-on transmitter to a service provider mechanism. The transmitter apparatus can provide support to broadcast signals from a specific channel, such as, for example, AM or FM radio, or Bluetooth, in a small local region. In one or more embodiments of the invention, a service provider can select one of the predefined channels to broadcast its messages.

For the service requesting credential verification, a service provider can sign their service meta-information with a digital certificate endorsed from a well-known certificate authority center before broadcasting. Additionally, if a transaction is required, both the service provider and service receiver can equate with endorsed digital certificates.

FIG. 1 is a diagram illustrating architecture, according to an embodiment of the present invention. By way of illustration, FIG. 1 depicts meta-information 102, which is transformed into web files 104, which are then sent to a personal computer (PC) 106 and/or cellular phones 108. Combined files are then sent to a transmitter 110, which provides encoded signals to one or more transmitters 112, which sends the combined files to a PC 114 and/or cell phones 116, which can then use the combined files to generate web files 118.

As depicted in FIG. 1, a service provider can implement one or more embodiments of the invention in its devices, such as PC 106 or cell phones 108. As described herein, web technologies, such as HTML, XML, JavaScript, etc., can be used to program a service of one or more embodiments of the invention because of their rich capability of representation and status as being well-supported by most of devices. Accordingly, the service can be implemented as a series of web files 104. In addition, similar technologies can be used to describe some meta-information of the service, such as its category, location, etc. The meta-information can be used by the service receiver to decide whether it is interested in the service.

The description of meta-information can be based on a standard ontology that has a unified format and semantics around all of the service providers so that users can correctly understand the service descriptions and make a decision as to service consumption. As also depicted in FIG. 1, one or more embodiments of the invention can include combining the meta-information 102 into the web files 104 or saving them into separate files and packaging them with the web files into a bundle. All of the information will be given to the transmitter 110 for broadcasting in the local region (whereas transmitter(s) 112, in the example of FIG. 1, receives the broadcasted signal).

Figure 2:
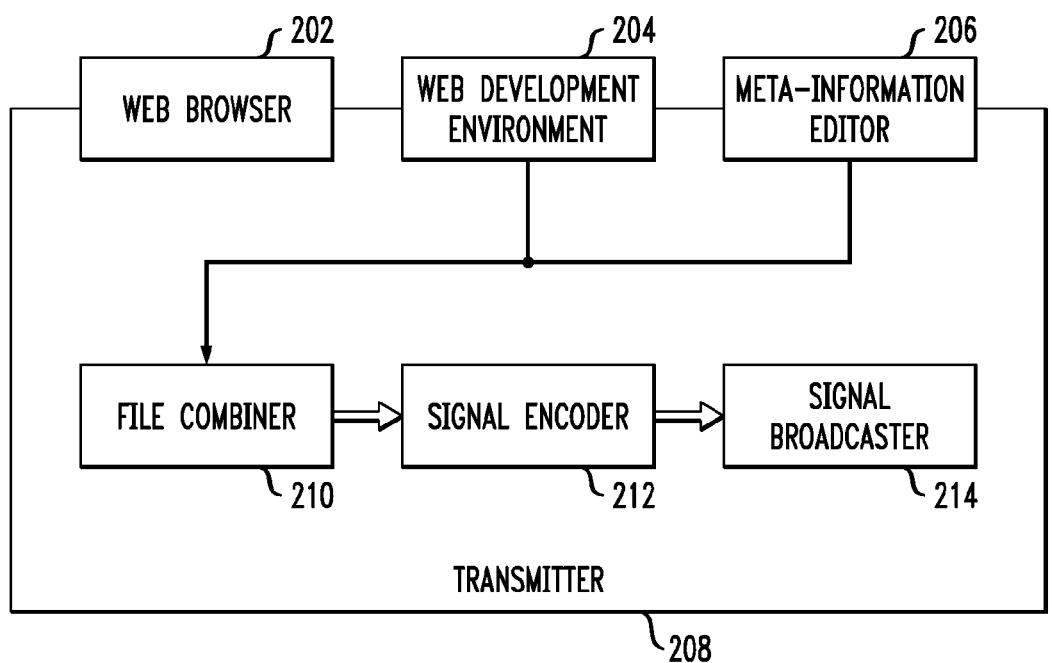
FIG. 2 is a diagram illustrating architecture of a transmitter, according to an embodiment of the present invention.

FIG. 2 is a diagram illustrating architecture of a transmitter, according to an embodiment of the present invention. By way of illustration, FIG. 2 depicts a web browser module 202, a web development environment module 204 and a meta-information editor module 206. FIG. 2 also depicts a transmitter 208, which includes a file combiner module 210, a signal encoder module 212 and a signal broadcaster module 214. While FIG. 2 illustrates example architecture of a transmitter (such as, for example, an implementation with a mobile phone that already contains a web browser), in one or more embodiments of the invention, a transmitter can include each of the depicted components (that is, modules 202, 204, 206, 210, 212 and 214).

As noted herein, one or more embodiments of the invention include developing a service based on web technologies and attaching meta-data thereto, and so a device of one or more embodiments of the invention can have a web development environment module 204 and meta-information editor module 206. Additionally, as depicted by FIG. 2, the file combiner module 210 in the transmitter 208 packages all related files into a bundle. The signal encoder module 212 in the transmitter transforms the files into a series of signals that can be broadcasted. Further, the signal broadcaster module 214 can broadcast the signals via specific channels (such as Wi-Fi, FM, AM, Bluetooth etc.) to a limited local region. In one or more embodiments of the invention, the transmitter 208 can connect to a service provider or end-user device, for example, through hot plugging interfaces, which could enable the user to quickly become a service provider and preclude the need to instrument the device. Accordingly, transmitter 208 can be used in place of transmitter 110 and/or transmitter(s) 112 in FIG. 1, as, in one or more embodiments of the invention, each transmitter is capable of broadcasting and receiving signals to enable bidirectional communications.

A service receiver can receive the messages from the provider in multiple ways. By way of example, the receiver can embed a decoder in its device, receive the broadcasted signals in the region and then restore them into original web contents. Additionally, for example, if the service receiver also wants to communicate back or become a provider, the receiver can include this decoding function in the transmitter, which makes the transmitter a bi-direction apparatus, as shown in FIG. 1. In either scenario, the device can receive the broadcasted signals when it enters the corresponding region and the channel is open. The decoder can then retrieve the meta-information of the service, such as the category, location, etc. For example, the category would help the receiver understand what type of service is being provided. Also, the user can detect the locations of such services and decide how to choose them based on the relative distance between both parties, for example, as illustrated in FIG. 3.

Figure 3:
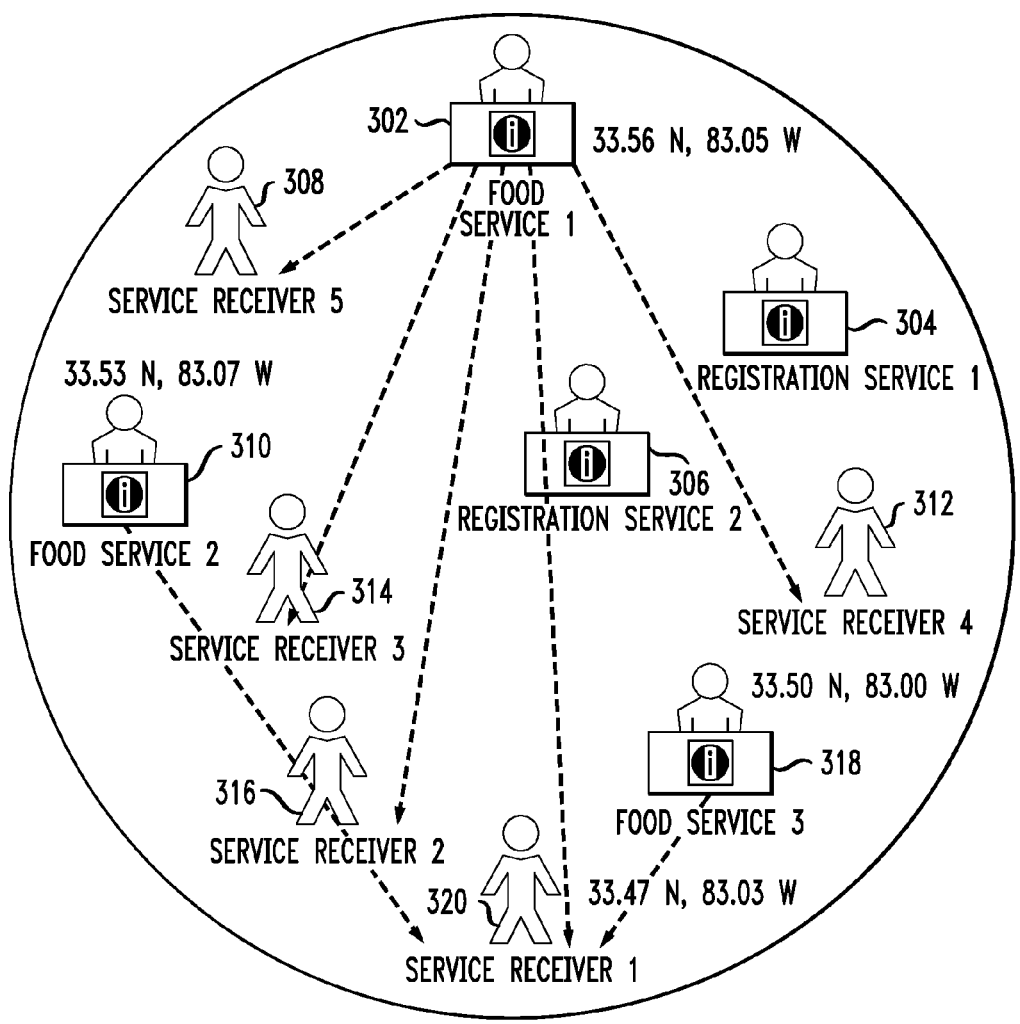
FIG. 3 is a diagram illustrating an example selection of services based on meta-information, according to an embodiment of the present invention.

FIG. 3 is a diagram illustrating an example selection of services based on meta-information, according to an embodiment of the present invention. By way of illustration, FIG. 3 depicts service receivers 320, 316, 314, 312 and 308, food services 302, 310 and 318, as well as registration services 304 and 306. As depicted by the example in FIG. 3, service receiver 320 can receive the broadcasted messages from the food service 302, 310 and 318. Service receiver 320 can also calculate the relative distance between it and the above services according to the services' absolute locations, and it may, for example, select food service 318 because the relative distance is the shortest.

After the receiver understands the basic description of the provider service, the receiver can also decide whether it needs or wants this service. If so, the decoder on the receiver side will continue to restore the service implementation on web files. The receiver can use the web browser in its device to view the complete content and begin the communication for transactions. If the receiver is not interested in the provider service, the receiver can simply send a response to reject the communication. If the receiver does not wish to receive the broadcasted signal from the onset, the receiver can turn off the corresponding channel. The service provider can also update its service periodically by broadcasting new messages.

One or more embodiments of the invention can include targeting highly dynamic environments, wherein the locations of the provider and receiver can change and the provider and receiver themselves can also dynamically appear and disappear. Accordingly, when the service provider is ready, it can simply plug-in the transmitter to its device and broadcast its messages. Other people in the same region may receive this broadcasted message, and if the provider provides its location or other contact information in the meta-data, other people can directly contact the provider. When a service receiver leaves the region, the service will automatically become unavailable or is replaced by new services in the new region. If a receiver goes out of the broadcasting region, it cannot receive the previously location-based messages either.

Figure 4:
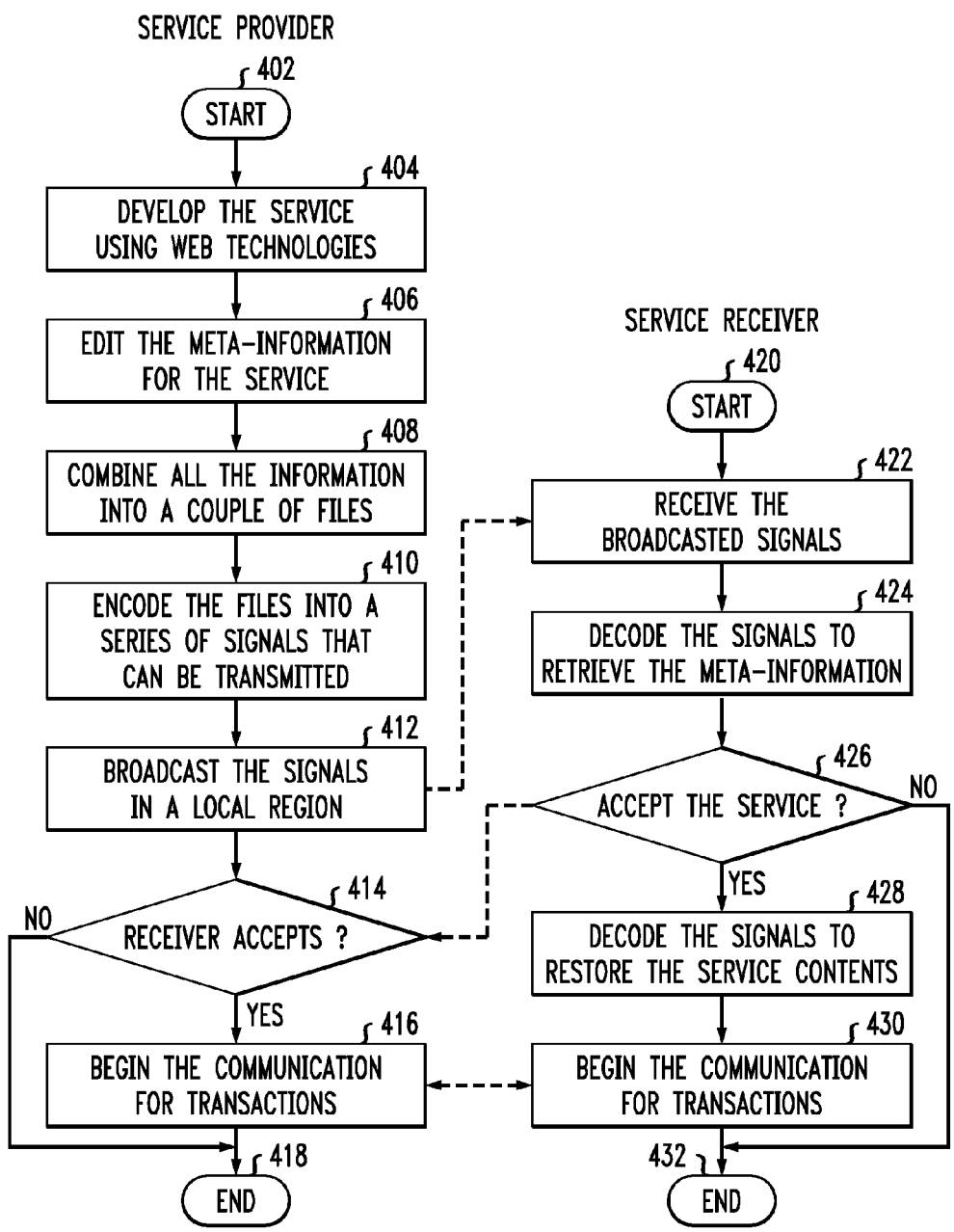
FIG. 4 is a flow diagram illustrating techniques for performing communication for transactions, according to an embodiment of the invention.

FIG. 4 is a flow diagram illustrating techniques for performing communication for transactions, according to an embodiment of the invention. FIG. 4 depicts steps to be performed by a service provider (that is, steps 402-418) as well as steps to be performed by a service receiver (that is, steps 420-432). Service provider steps can include the following. Step 402 includes starting the process. Step 404 includes developing a service using web technologies. Step 406 includes editing meta-information for the service. Step 408 includes combining all of the information into a couple of files. In one or more embodiments of the invention, the meta-information can be recorded into one or more services files or saved into separate files.

Step 410 includes encoding the files into a series of signals that can be transmitted. Step 412 includes broadcasting the signals in a local region. Additionally, step 414 includes determining whether a receiver accepts the service. If no, then proceed to step 418 and end the process. If a receiver does accept the service, then step 416 includes beginning the communication for a transaction.

Further, service receiver steps can include the following. Step 420 includes starting the process. Step 422 includes receiving broadcast signals from a service provider. Step 424 includes decoding the signals to retrieve meta-information about a service. Step 426 includes determining whether or not to accept the service. If no, then proceed to step 431 and end the process. If the receiver does accept the service, then step 428 includes decoding the signals to restore the service contents, and step 430 includes beginning the communication for a transaction.

Additionally, as detailed herein, one or more embodiments of the invention can be implemented, for example, in connection with a physical layer (for example, existing Bluetooth, Wi-Fi, radio broadcast, etc.), communication protocols (for example, really simple syndication (RSS), HTML, transmission control protocol/internet protocol (TCP/IP), etc.), as well as devices. Devices can include, by way of example, a base state, which can be any computer connected to a Wi-Fi router or with a Bluetooth, and a client in the form of a cellular phone or pervasive device with Wi-Fi or blue tooth enabled.

Figure 5:
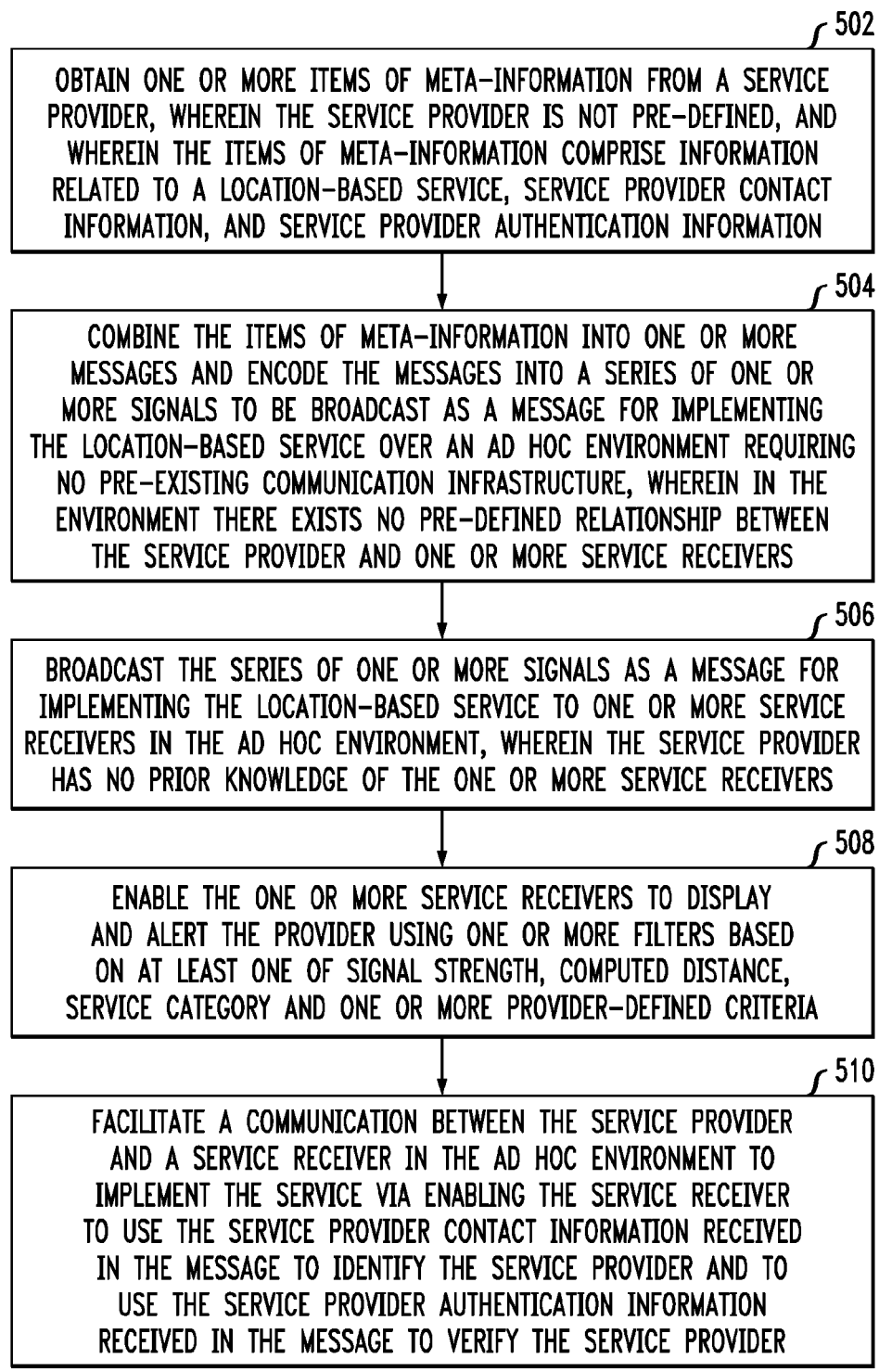
FIG. 5 is a flow diagram illustrating techniques for broadcasting a message for implementing a location-based service, according to an embodiment of the invention.

FIG. 5 is a flow diagram illustrating techniques for broadcasting a message for implementing a location-based service, according to an embodiment of the present invention. Step 502 includes obtaining one or more items of meta-information from a service provider, wherein the service provider is not pre-defined, and wherein the one or more items of meta-information comprise information related to a location-based service, service provider contact information, and service provider authentication information. This step can be carried out, for example, using a meta-information editor module. The meta-information related to a location-based service can include, for example, location of the service, category of the service, communication channel to be used for broadcasting, service description, service provider authentication information, etc. Additionally, the meta-information can be based on a standard ontology.

Step 504 includes combining the one or more items of meta-information into one or more messages and encoding the one or more messages into a series of one or more signals to be broadcast as a message for implementing the location-based service over an ad hoc environment requiring no pre-existing communication infrastructure, wherein in the ad hoc environment there exists no pre-defined relationship between the service provider and one or more service receivers. This step can be carried out, for example, using a file combiner module and a signal encoder module. In one or more embodiments of the invention, the meta-information can be recorded into the files, such as XML files, and the service user interface (if present) can be also implemented into a series of files, such as HTML files, from the implementation perspective.

Step 506 includes broadcasting the series of one or more signals as a message for implementing the location-based service to one or more service receivers in the ad hoc environment, wherein the service provider has no prior knowledge of the one or more service receivers. This step can be carried out, for example, using a signal broadcaster module. Broadcasting the series of signals as a message for implementing the location-based service to a predetermined geographic region can include broadcasting the series of one or more signals as a to a predetermined geographic region via one or more specific channels (for example, Wi-Fi, FM radio, AM radio, Bluetooth, etc.).

Step 508 includes enabling the one or more service receivers to display and alert the service provider using one or more filters based on at least one of signal strength, computed distance, service category, and one or more provider-defined criteria. This step can be carried out, for example, using a web browser module. The filter mechanism can be implemented as the selection rules plugged in the web browser module, and the service receiver can view the corresponding meta-information of the service provider that passes the filter in the web browser module, and then perform a final decision.

Step 510 includes facilitating a communication between the service provider and a service receiver in the ad hoc environment to implement the service via enabling the service receiver to use the service provider contact information received in the message to identify the service provider and to use the service provider authentication information received in the message to verify the service provider. After the service receiver selects a specific service provider, the receiver can use the transmitter such as depicted as component 208 in FIG. 2) to communicate with the provider to consume the service.

The techniques depicted in FIG. 5 can also include identifying one or more devices capable of receiving the broadcasted message, as well as displaying the message on those devices capable of receiving the message. The techniques depicted in FIG. 5 also include facilitating the one or more devices to enable the service receiver to select a service provider based on the displayed the meta-information. One or more embodiments of the invention further include facilitating devices to decode the broadcasted message to restore original content and/or display the original items of meta-information. Additionally, one or more embodiments of the invention include facilitating establishing a communication between such devices and a provider of the location-based service via enabling the service receiver to use the service provider contact information received in the message to identify the service provider and to use the service provider authentication information received in the message to verify the service provider.

The techniques depicted in FIG. 5 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a web browser module, a web development environment module, a meta-information editor module, a file combiner module, a signal encoder module and a signal broadcaster module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

One or more embodiments of the invention also include implementation of an apparatus for broadcasting a message for implementing a location-based service. Such an apparatus can include a file combiner module for packaging files related to the location-based service into a bundle, a signal encoder module for transforming the files in the bundle into a series of signals to be broadcast as a message for implementing the location-based service, and a signal broadcaster module for broadcasting the series of one or more signals as a message for implementing the location-based service to a predetermined geographic region.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
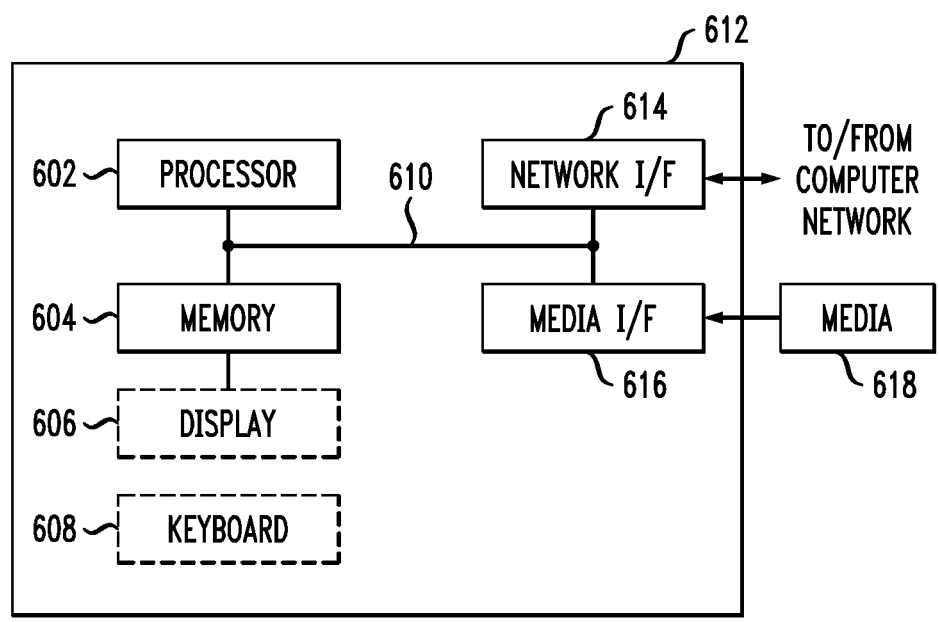
FIG. 6 is a system diagram of an exemplary computer system on which at least one embodiment of the invention can be implemented.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 2. The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing a server-less mechanism for broadcasting messages.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for implementing a location-based service, the method comprising:

obtaining one or more items of meta-information from a service provider, wherein the service provider is not pre-defined, and wherein the one or more items of meta-information comprise information related to a location-based service, service provider contact information, and service provider authentication information;

combining the one or more items of meta-information into one or more messages and encoding the one or more messages into a series of one or more signals to be broadcast as a message for implementing the location-based service over an ad hoc environment with no pre-existing communication infrastructure and no pre-existing linkage between the service provider and one or more service receivers;

broadcasting the series of one or more signals as a message for implementing the location-based service to one or more service receivers in the ad hoc environment to establish a linkage between based on relative distance and signal strength between the service provider and the one or more service receiver, wherein the service provider has no prior knowledge of the one or more service receivers;

enabling the one or more service receivers to display and alert the service provider using one or more filters based on at least one of signal strength, computed distance, service category, and one or more provider-defined criteria; and facilitating a communication between the service provider and a service receiver in the ad hoc environment to implement the service via enabling the service receiver to use the service provider contact information received in the message to identify the service provider and to use the service provider authentication information received in the message to verify the service provider.

2. The method of claim 1, wherein the one or more items of meta-information related to a location-based service comprise at least one of location of the service, category of the service, communication channel to be used for broadcasting, service description, and service provider authentication information.

3. The method of claim 1, wherein the one or more items of meta-information are based on a standard ontology.

4. The method of claim 1, wherein broadcasting the series of one or more signals as a message for implementing the location-based service comprises broadcasting the series of one or more signals as a message for implementing the location-based service to a predetermined geographic region via one or more specific channels.

5. The method of claim 4, wherein the one or more specific channels comprise at least one of Wi-Fi, FM radio, AM radio, and Bluetooth.

6. The method of claim 1, further comprising identifying one or more devices capable of receiving the broadcasted message.

7. The method of claim 6, further comprising displaying the message on the one or more devices capable of receiving the broadcasted message.

8. The method of claim 6, further comprising facilitating the one or more devices to decode the broadcasted message to restore original content.

9. The method of claim 6, further comprising facilitating the one or more devices to decode the broadcasted message to display the one or more items of meta-information.

10. The method of claim 6, further comprising facilitating the one or more devices to enable the service receiver to select a service provider based on the displayed meta-information.

11. The method of claim 6, further comprising facilitating establishing a communication between the one or more devices and a provider of the location-based service via enabling the service receiver to use the service provider contact information received in the message to identify the service provider and to use the service provider authentication information received in the message to verify the service provider.

12. The method of claim 1, further comprising providing a system, wherein the system comprises one or more distinct software modules, each of the one or more distinct software modules being embodied on a tangible computer-readable recordable storage medium, and wherein the one or more distinct software modules comprise a meta-information editor module, a file combiner module, a signal encoder module and a signal broadcaster module executing on a hardware processor.

13. An apparatus for broadcasting a message for implementing a location-based service, wherein the apparatus comprises:
a file combiner module, wherein the file combiner module packages one or more files into a bundle, wherein the one or more files comprise one or more files related to the location-based service, one or more service provider contact information files, and one or more service provider authentication information files;
a signal encoder module, wherein the signal encoder module transforms the one or more files in the bundle into a series of one or more signals to be broadcast as a message for implementing the location-based service over an ad hoc environment with no pre-existing communication infrastructure and no pre-existing linkage between the service provider and one or more service receivers;
a signal broadcaster module, wherein the signal broadcaster module broadcasts the series of one or more signals as a message for implementing the location-based service to one or more service receivers in the ad hoc environment to establish a linkage between based on relative distance and signal strength between the service provider and the one or more service receiver, wherein the service provider has no prior knowledge of the one or more service receivers;
a web browser module, wherein the a web browser module enables the one or more service receivers to display and alert the service provider using one or more filters based on at least one of signal strength, computed distance, service category, and one or more provider-defined criteria; and
a module for facilitating a communication between the service provider and a service receiver in the ad hoc environment to implement the service via enabling the service receiver to use the service provider contact information received in the message to identify the service provider and to use the service provider authentication information received in the message to verify the service provider.

14. The apparatus of claim 13, wherein the signal broadcaster module broadcasts the series of one or more signals as a message for implementing the location-based service to a predetermined geographic region via one or more specific channels.

15. The apparatus of claim 14, wherein the one or more specific channels comprise at least one of Wi-Fi, FM radio, AM radio, and Bluetooth.

16. The apparatus of claim 13, wherein the apparatus connects to a device, wherein the device comprises at least one of a personal computer and a cellular phone.

17. A computer program product comprising a non-transitory computer readable recordable storage medium including computer useable program code for broadcasting a message for implementing a location-based service, the computer program product including:
computer useable program code for packaging one or more files into a bundle, wherein the one or more files comprise one or more files related to the location-based service, one or more service provider contact information files, and one or more service provider authentication information files;
computer useable program code for transforming the one or more files in the bundle into a series of one or more signals to be broadcast as a message for implementing the location-based service over an ad hoc environment with no pre-existing communication infrastructure and no pre-existing linkage between the service provider and one or more service receivers;
computer useable program code for broadcasting the series of one or more signals as a message for implementing the location-based service to one or more service receivers in the ad hoc environment to establish a linkage between based on relative distance and signal strength between the service provider and the one or more service receiver, wherein the service provider has no prior knowledge of the one or more service receivers;
computer useable program code for enabling the one or more service receivers to display and alert the service provider using one or more filters based on at least one of signal strength, computed distance, service category, and one or more provider-defined criteria; and computer useable program code for facilitating a communication between the service provider and a service receiver in the ad hoc environment to implement the service via enabling the service receiver to use the service provider contact information received in the message to identify the service provider and to use the service provider authentication information received in the message to verify the service provider.

18. The computer program product of claim 17, wherein the computer useable program code for broadcasting the series of one or more signals as a message for implementing the location-based service comprises computer useable program code for broadcasting the series of one or more signals as a message for implementing the location-based service to a predetermined geographic region via one or more specific channels.

19. The computer program product of claim 17, further comprising computer useable program code for identifying one or more devices capable of receiving the broadcasted message.

20. The computer program product of claim 19, further comprising computer useable program code for facilitating establishing a communication between the one or more devices and a provider of the location-based service.

* * * * *